United States Patent
Yang et al.

(10) Patent No.: US 10,996,857 B1
(45) Date of Patent: May 4, 2021

(54) EXTENT MAP PERFORMANCE

(71) Applicant: Ventas Technologies LLC, Santa Clara, CA (US)

(72) Inventors: Yong Yang, Beijing (CN); Weibao Wu, Vadnais Heights, MN (US); Gallen Liu, Sichuan (CN)

(73) Assignee: Veritas Technologies LLC, Santa Clara, CA (US)

( * ) Notice: Subject to any disclaimer, the term of this patent is extended or adjusted under 35 U.S.C. 154(b) by 61 days.

(21) Appl. No.: 15/445,184

(22) Filed: Feb. 28, 2017

(51) Int. Cl.
*G06F 3/06* (2006.01)
*G06F 12/10* (2016.01)

(52) U.S. Cl.
CPC .............. *G06F 3/061* (2013.01); *G06F 3/064* (2013.01); *G06F 3/067* (2013.01); *G06F 3/0673* (2013.01); *G06F 12/10* (2013.01); *G06F 2212/1016* (2013.01); *G06F 2212/263* (2013.01)

(58) Field of Classification Search
None
See application file for complete search history.

(56) References Cited

U.S. PATENT DOCUMENTS

| | | | | |
|---|---|---|---|---|
| 7,313,724 | B1 * | 12/2007 | Kekre | G06F 11/2082 714/12 |
| 8,745,338 | B1 * | 6/2014 | Yadav | G06F 3/0619 711/154 |
| 2003/0041214 | A1 * | 2/2003 | Hirao | G06F 12/0862 711/137 |
| 2006/0259728 | A1 * | 11/2006 | Chandrasekaran | G06F 3/0605 711/170 |
| 2012/0278382 | A1 * | 11/2012 | Faith | G06F 3/064 709/203 |
| 2013/0166855 | A1 * | 6/2013 | Batwara | G06F 3/0608 711/154 |
| 2013/0185493 | A1 * | 7/2013 | Benhase | G06F 12/128 711/105 |
| 2013/0290648 | A1 * | 10/2013 | Shao | G06F 12/04 711/154 |

* cited by examiner

*Primary Examiner* — Yaima Rigol
*Assistant Examiner* — Alexander J Yoon
(74) *Attorney, Agent, or Firm* — Campbell Stephenson LLP

(57) ABSTRACT

Disclosed are methods, systems, and processes to improve extent map performance A request for a data block is received. In response to detecting a cache miss, a temporary table is searched for the data block. If the data block is not found in the temporary table, a base table is searched for the data block.

20 Claims, 10 Drawing Sheets

EXTENT MAP PERFORMANCE

FIELD OF THE DISCLOSURE

The present disclosure relates to data storage and backup. In particular, this disclosure relates to improving extent map performance in data storage and backup environments.

DESCRIPTION OF THE RELATED ART

A file system is a software program that organizes and controls access to files. A file system can maintain metadata that identifies files (including directories, which are special files that can act as containers for one or more files), as well as a given file's location on a storage device, size, and other information such as creation time, most recent access time, and the like. Such information can be maintained in an Mode structure for certain file systems.

Random and sequential input/output (I/O) operations are access patterns of data stored on a storage device. For example, data stored on a storage device can be accessed randomly or sequentially. Depending on the size of data and/or the number of times the data is accessed, random and/or sequential I/O operations can be resource intensive and may require a file system to be mounted for a significant amount of time.

An extent is a contiguous area of storage reserved for a file in a file system. A data structure such as an extent map can be used to store and retrieve data, for example in block-oriented storage devices that use extent-based file systems. Unfortunately, servicing random and/or sequential I/O operations over time leads to extent map fragmentation resulting in a negative performance impact on extent map traversal, as well as a downgrade in the speed of servicing read and write operations.

SUMMARY OF THE DISCLOSURE

Disclosed herein are methods, systems, and processes to improve extent map performance One such method involves receiving a request for a data block, and in response to detecting a cache miss, searching a temporary table for the data block. If the data block is not found in the temporary table, the method searches a base table for the data block.

In one embodiment, the method stores an extent identifier in the cache. In this example, the extent identifier is associated with the data block, and the extent identifier includes a start offset and an end offset. The method determines that a size of the temporary table has exceeded a threshold value, generating an object identifier for the extent identifier, and stores the extent identifier in the temporary table.

In some embodiments, in response to the determining that the size of the temporary table has exceeded the threshold value, the method generates a merged table. In this example, the merged table includes one or more extents identifiers stored in the cache and one or more extents identifiers stored in the temporary table.

In other embodiments, the method receives a request for the extent identifier; searches for the extent identifier in the cache, and generates a first search result, that indicates whether the temporary table should be searched. In this example, if the first search result indicates that the extent identifier is not found in the cache, the method searches for the extent identifier in the temporary table, and generates a second search result that indicates whether the base table should be searched.

In certain embodiments, if the extent identifier is found in the temporary table, the method determines whether the extent identifier overlaps with another extent identifier in the cache. In this example, if the extent identifier overlaps with the another extent identifier, the method returns a portion of a range of the another extent identifier that does not overlap with the extent identifier. However, if the extent identifier is not found in the temporary table, the method searches for the extent identifier in the base table, and generates a third search result.

The foregoing is a summary and thus contains, by necessity, simplifications, generalizations and omissions of detail; consequently those skilled in the art will appreciate that the summary is illustrative only and is not intended to be in any limiting. Other aspects, inventive features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent to those skilled in the art by referencing the accompanying drawings.

Figure 1:
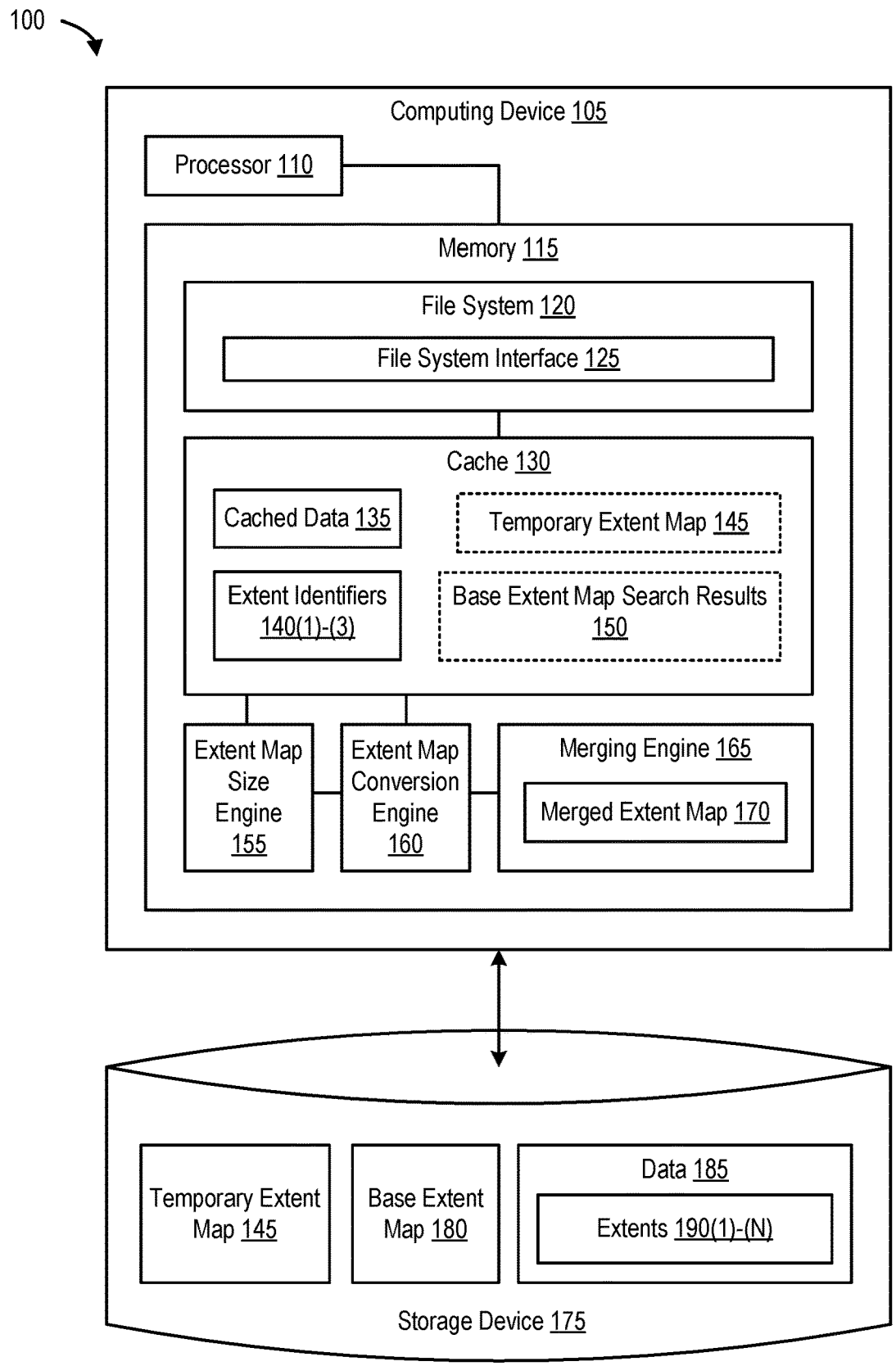
FIG. 1 is a block diagram 100 of a computing system that can improve extent map performance, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

A file system is a software program that organizes and controls access to files. A file system can maintain metadata that identifies files (including directories, which are special files that can act as containers for one or more files), as well as a given file's location on a storage device, size, and other information such as creation time, most recent access time, and the like. Such information can be maintained in an Mode structure for certain file systems.

The term "file system" can refer to a software application (which itself can be part of an operating system or database) that organizes the files and the collection of files that are organized by that application. Files can be organized hierarchically, with directories collecting groups of files and/or other directories. A file system application can provide another application, such as a database application, with access to files (e.g., to open, read, modify, create, delete, and otherwise interact with the data within the files).

A file system application also tracks how the files it organizes map to the blocks of data within an underlying storage device using metadata (e.g., extent information). This way, when an application such as a database requests access to a particular file (e.g., using the file name of the file), the file system can translate that request into a request for the particular blocks of data included in the requested file. Accordingly, the file system application knows which blocks of data in a storage device belong to each file.

It should be noted that each block is a unit of data. In some embodiments, blocks are fixed-size units of data that represent the smallest granularity of data that can be manipulated by the file system application, underlying persistent storage device, and/or operating system. In other embodiments, blocks can be variably-sized, can represent a larger granularity than the smallest representable by the file system, and/or have other, different characteristics than specified here. It will be appreciated that a file system can also be used to control which data is moved into and out of a cache.

Caching is a technique that allows data that is being accessed (or is likely to be accessed in the near future) by an application to be temporarily cached by temporarily moving that data from a slower storage device to a faster storage device. Caching can reduce the time the application takes to access data, and thus is a technique that is often used to improve application performance. Accordingly, the performance of an application can be improved by caching the data it uses in a faster storage device (e.g., in memory).

A file system permits data stored on a storage device to be accessed randomly and/or sequentially. As previously noted, random and sequential input/output (I/O) operations are access patterns of data stored on a storage device. Typically, accessing a block on a storage device (e.g., a disk drive) requires the disk drive's actuator arm to move a disk head to the correct track (e.g., seek time). Then, a disk platter has to rotate to locate the correct sector (e.g., rotational latency). This mechanical action takes time and depends on where the disk head was previously located and the location of the sector on the platter. If the next block is somewhere else on the disk drive, penalties associated with seek time and rotational latency are incurred. This type of operation is called a random I/O operation. However, if the next block is located directly after the previous block on the same track, the disk head would encounter this next block immediately afterwards, and thus would incur no wait time (e.g., no latency). This type of operation is called a sequential I/O operation. Depending on the size of blocks and/or the number of times the blocks are accessed, random and/or sequential I/O operations can be resource intensive and may require a file system to be mounted for a significant amount of time.

An extent is a contiguous area of storage reserved for a file in a file system. An extent map (e.g., in the form of a B+ tree data structure, an n-ary tree index, and the like) can be used to store and retrieve data, for example in block-oriented storage devices that use extent-based file systems. Unfortunately, servicing random and/or sequential I/O operations, particularly over time leads to extent map fragmentation. Such extent map fragmentation results in a negative performance impact on extent map traversal (e.g., time required to search for extent information in an extent map), as well as negatively affecting the speed with which read and write operations associated with random and/or sequential I/O operations are serviced.

Several different types of extent map fragmentation scenarios can result from constantly updating an extent map as a result of random and/or sequential I/O operations over time. For example, at least the following types of fragmentation issues, among others, can be encountered with extent maps: (1) tablespace free space fragmentation (TFF) occurs when a tablespace contains more than one extent of free space, (2) segment fragmentation (SF) occurs when a segment is so large as to consume multiple extents, (3) data block fragmentation (DBF) occurs when rows are deleted from blocks leaving holes of unused space, (4) index leaf block fragmentation occurs when rows are deleted creating partially or fully empty leaf blocks in an index B-tree, and (5) row fragmentation (RF) or chaining occurs when an update increases a row length such that the update cannot fit a current block and must migrate to a new block that has sufficient space for the entire row.

In addition, an extent map that increases in size (over time) and is maintained in memory can consume valuable memory resources. For example, a 256 GB file can require an extent map or index that requires 32 MB of space. Therefore, it will be appreciated that (randomly) updating an extent map or index over a period of time because of random and/or sequential I/O operations: (1) negatively affects file system performance because a given file system has to remain mounted for the duration of servicing such I/O operations as well as during the updating of the extent map, (2) undesirably impacts random and/or sequential I/O performance, and (3) adversely affects the performance of the extent map itself (e.g., because of fragmentation as discussed above).

Disclosed herein are methods, systems, and processes to improve extent map performance, particularly in data storage and backup environments that are configured to perform random and/or sequential I/O operations. It is desirable to provide: (1) an always online file system (e.g., to prevent the constant mounting and dismounting of a file system), (2) consistent performance for random and/or sequential I/O operations that access (and update) extent map(s), and (3) stable performance from extent map(s) over time (e.g., avoiding fragmentation).

Example Computing System to Improve Extent Map Performance

FIG. 1 is a block diagram 100 of a computing system that can improve extent map performance, according to one embodiment. Computing device 105 includes a processor 110 and a memory 115. Memory 115 implements a file system 120. File system 120 includes a file system interface 125 (e.g., to permit a user to configure, schedule, and/or perform input/output (I/O) operations). Memory 115 also implements a cache 130.

Cache 130 includes cached data 135, extent identifiers 140(1)-(3), a temporary extent map 145, and a base extent map search results 150. In one embodiment, the temporary extent map and the base extent map search results are brought in-memory from storage device 175. Memory 115 also implements an extent map size engine 155, an extent map conversion engine 160, and a merging engine 165. Merging engine 165 includes a merged extent map 170. It should be noted that extent map size engine 155, extent map conversion engine 160, and merging engine 165 can be implemented together in computing device 105, or can each be implemented separately, for example, by disparate computing devices.

In some embodiments, modified blocks (of data) within cache 130 (e.g., blocks that the cache indicates have been modified since those blocks were moved into the cache; such blocks can also be described as "dirty" blocks) are written back to storage device 175 (e.g., when those blocks are initially modified within the cache in a "write-though" cache implementation or when those modified blocks are removed from the cache in a "write-back" cache implementation).

Storage device 175 is communicatively coupled to computing device 105. Storage device 175 can be communicatively coupled to computing device 105 directly, as shown in FIG. 1, or via any type of network and/or interconnection. In one embodiment, storage device 175 is a persistent storage device. Storage device 175 stores temporary extent map 145, a base extent map 180, and data 185. Data 185 includes extents 190(1)-(N).

Storage device 175 can include one or more of a variety of different storage devices, including hard disks, compact discs, digital versatile discs, solid state drive (SSD) memory such as Flash memory, and the like, or one or more logical storage devices such as volumes implemented on one or more such physical storage devices. Storage device 175 is described as providing persistent storage because data stored on storage device 175 can be maintained (e.g., for a non-negligible time, such as several minutes, hours, days, weeks, years, decades, and so on), even if the power to storage device 175 and/or to a drive that reads and writes to storage device 175 is interrupted or cycled off for a non-negligible time.

Figure 2A:
FIG. 2A is a block diagram 200A of a temporary extent map, according to one embodiment of the present disclosure.

FIG. 2A is a block diagram 200A of a temporary extent map, according to one embodiment. Temporary extent map 145 is stored in storage device 175 and can be brought in-memory by cache 130 (e.g., copied from storage device 175 to memory 115). In one embodiment, temporary extent map 145 includes extent identifiers (e.g., extent identifiers 145(1)-(3)), each with their own start offset and end offset. In some embodiments, temporary extent map 145 is a B+ tree index and is referred to as a small table or a temporary table.

When data is first generated (e.g., during a first write operation), an extent identifier is generated for the data (e.g., with a start offset and an end offset). An object identifier (e.g., object identifiers 220(1)-(3) as shown in FIG. 2A) is later generated for that extent identifier, and the extent identifier is submitted to temporary extent map 145 with a start offset, an end offset, and an object identifier. For example, extent identifier 140(1) has a start offset 205(1), an end offset 210(1), a size 215(1), and is associated with an object identifier 220(1).

Figure 2B:
FIG. 2B is a block diagram 200B of a base extent map, according to one embodiment of the present disclosure.

FIG. 2B is a block diagram 200B of a base extent map, according to one embodiment. Like temporary extent map 145, base extent map 180 is also stored in storage device 175, but unlike temporary extent map 145, is not brought in-memory. Base extent map 180 includes extent identifiers, each with their own start offset, end offset, size, and associated object identifier. In some embodiments, base extent map 180 is also B+ tree index and is referred to as a big table or a base table. It should be noted that temporary extent map 145 and base extent map 180 can each be any type of index, n-aray tree, extent map, or comparable data structure.

Example(s) of Submitting Extent Information to Extent Map(s)

Figure 3A:
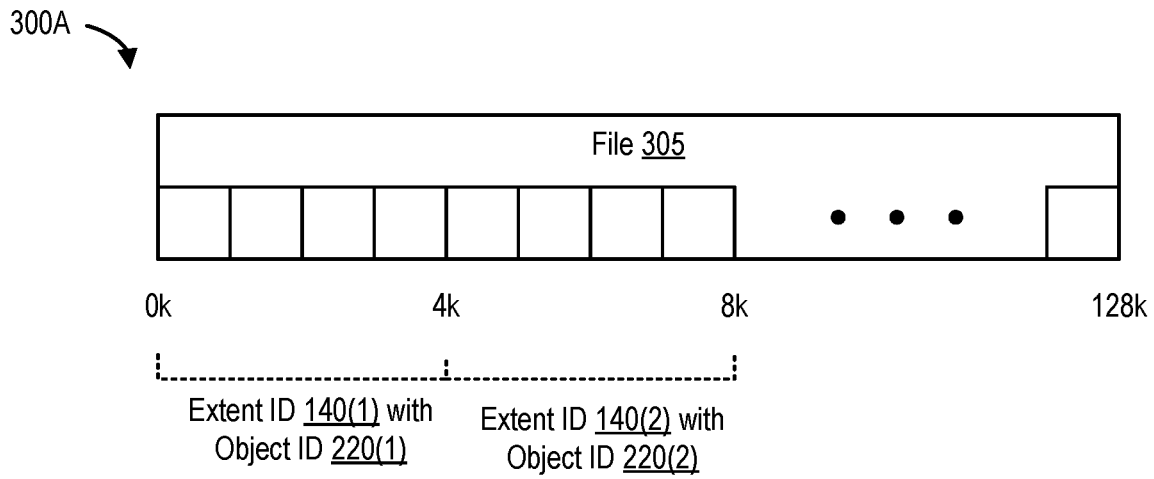
FIG. 3A is a block diagram 300A of extent identifiers, according to one embodiment of the present disclosure.

FIG. 3A is a block diagram 300A of extent identifiers, according to one embodiment. In file system 120, a (given) file (e.g., file 305 as shown in FIG. 3A) is divided into a number of smaller extents, which are typically from 4 k to 128 k. Each extent is identified by an extent identifier, and is thus associated with an object identifier. An extent identifier identifies and a given extent in storage device 175, each of which is defined by a start offset and an end offset (in addition to the extent's size and associated object identifier).

In some embodiments, extent information submission to an extent map (e.g., temporary extent map 145) is performed in at least two phases. First, during a first write operation (e.g., modified data), an extent identifier is generated along with a start offset and an end offset. Second, an object identifier is generated for that particular extent identifier. Then the extent information (e.g., extent identifier, logical offsets, and object identifier) is submitted, for example, to temporary extent map 145.

Figure 3B:
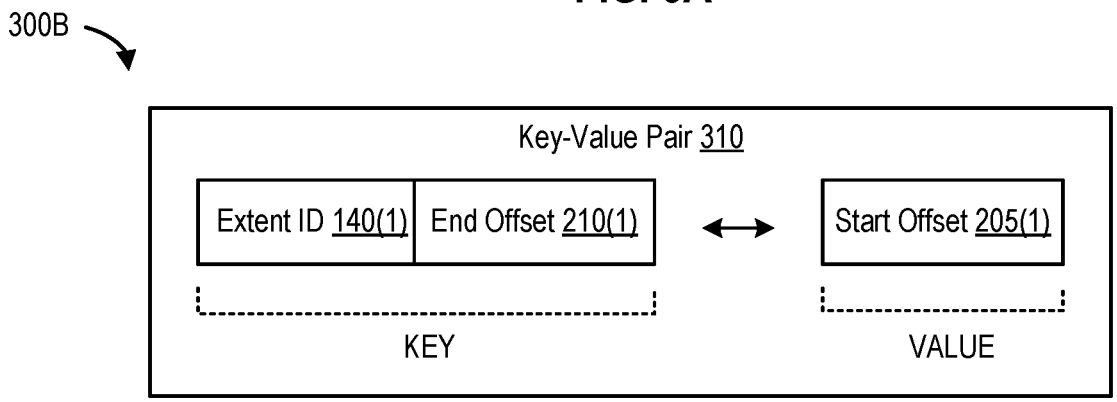
FIG. 3B is a block diagram 300B of a key-value pair, according to one embodiment of the present disclosure.

FIG. 3B is a block diagram 300B of a key-value pair, according to one embodiment. As shown in FIG. 3B, a key-value pair such as key value pair 310 is an open-ended data structure that allows for future extension without modifying existing code or data. In addition, all or part of a data model may be expressed as a collection of tuples. For example, as shown in FIG. 3B, extent identifier 140(1) and end offset 210(1) form a key, for which start offset 205(1) is the corresponding value. Therefore, key-value pair 310 is a pair, represents an extent (e.g., in data 185), and can be split (e.g., as a result of extent overlap).

Extents in the same extent map do not overlap, but extents between extent maps can overlap (e.g., fully or partially). An extent in a temporary extent map can split an extent in a base extent map (e.g., partially overlap). Therefore, the "key" portion of a key-value pair is not the only factor that is relevant for searching, when searching for data stored in storage device 175. Merging extent maps may also generate new entries (e.g., new extent information).

Figure 3C:
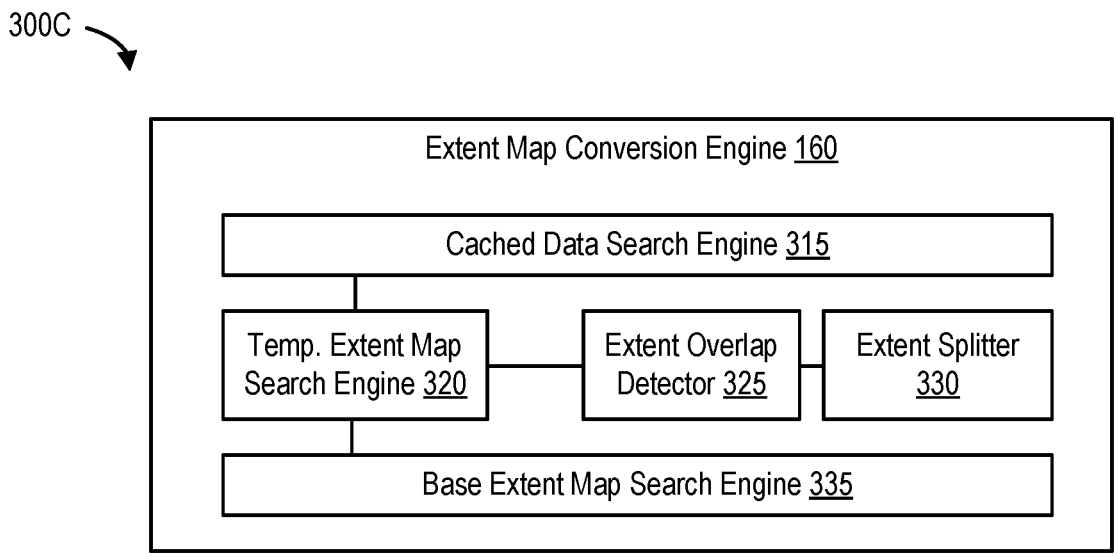
FIG. 3C is a block diagram 300C of an extent map conversion engine, according to one embodiment of the present disclosure.

FIG. 3C is a block diagram 300C of an extent map conversion engine, according to one embodiment. Extent map conversion engine 160 includes a cached data search engine 315, a temporary extent map search engine 320, an extent overlap detector 325, an extent splitter 330, and a base extent map search engine 335.

In one embodiment, temporary extent map 145 is brought in-memory (e.g., copied into memory 115 and/or cache 130) from storage device 175. In this example, temporary extent map 145 is used for tracking frequent updates (e.g., frequently modified data), and base extent map 180 is used as a base. It should be noted that updating temporary extent map 145 does not necessarily affect (e.g., modify or alter) base extent map 180.

In some embodiments, temporary extent map 145 (which can be implemented, e.g., as a small table) is merged with base extent map 180 (which can be implemented, e.g., as a big table) if extent map size engine 155 determines that temporary extent map 145 is increasing in size (e.g., beyond a given threshold). In this example, extent map size engine 155 creates or generates a new temporary extent map (e.g., a new empty small table). Merging the contents of temporary extent map 145 and base extent map 180 in this example can result in extent overlap (e.g., at least partially) because the start offset(s) and end offset(s) of extent identifiers in the temporary extent map and the base extent map may define extents that are co-extensive and so overlap (e.g., as shown in FIG. 2B). Extent overlap can be detected by extent overlap detector 325, which can then trigger operations to split the affected extent(s).

In certain embodiments, base extent map 180 is searched by base extent map search engine 335 if requested data is not located and/or identified in temporary extent map 145. If a given key-value part is determined by extent overlap detector 325 to be overlapping, results obtained from searching base extent map 180 by base extent map search engine 335 is merged with temporary extent map 145. It should be noted that extent map merging is performed in a background thread. Therefore, it will be appreciated that merging extent maps in this manner does not block front job(s), and a user can continue querying file system 120 for data and can perform I/O operations to cache 130 and/or storage device 175 without interruption.

Example(s) of Extent Map Writing

In some embodiments, an extent identifier (e.g., extent identifier 140(1)) is first cached in memory (e.g., in cache 130 in memory 115 as shown in FIG. 1) with only the logical offsets (e.g., a start offset and an end offset). If and when the size of extent information cached in memory reaches (e.g., meets or exceeds) a given threshold (e.g., as determined by a user, an administrator, or in some other manner), updated extent information (e.g., the start offset, the end offset, plus an object identifier) is submitted to temporary extent map 145 in batch.

In other embodiments, if and when the size of extent information in temporary extent map 145 reaches (e.g., meets or exceeds) (another) given threshold (e.g., as determined by a user, an administrator, or in some other manner), a background thread is created to merge extent information in cache 130 and extent information in temporary extent map 145 because the background thread does not keep the managed execution environment running. Once extent information in cache 130 and extent information in temporary extent map 145 are merged, a new temporary extent map is generated (or created), and the merged extent map (e.g., merged extent map 170 as shown in FIG. 1) is converted to base extent map 180.

Example(s) of Extent Map Reading

In certain embodiments, cache 130 is first searched by cache data search engine 315 for requested data. If the (requested) data is found in cache 130, the data is served from cache 130 (e.g., from cached data 135). However, if the data is not found in cache 130, temporary extent map search engine 320 searches temporary extent map 145 for the data. If the (requested) data is located and/or identified in temporary extent map 145, extent overlap detector 325 detects if there is any overlap between extent identifiers in temporary extent map 145 and extent identifiers in cache 130. If there is overlap between extent identifiers in temporary extent map 145 and extent identifiers in cache 130, extent splitter 330 splits the overlapping extents (represented by their respective extent identifiers).

For example, a data request can include a request for data starting at offset 100 (e.g., start offset is 100). In this example, cached data search engine 315 first searches cache 130 and only finds data stored between logical offsets 110-200 in cache 130 (e.g., because logical offsets 110-200 have been overwritten with new data). Temporary extent map search engine 320 then searches temporary extent map 145 and locates and/or identifies logical offsets 100-200 with an object identifier (e.g., object ID_1) in temporary extent map 145. In this example, temporary extent map 145 would return logical offsets 100-110 with object ID_1 to the user.

However, if offset 100 is not found, located, and/or identified in temporary extent map 145 by temporary extent map search engine 320, base extent map search engine 335 searches base extent map 180, merges base extent map search results 150 with the record in temporary extent map 145 (e.g., extent map information in temporary extent map 145, and then finally merges this result (e.g., base extent map search results 150 plus the record in temporary extent map 145) with search results from cached data search engine 315 (e.g., from cache 130, received as part of the initial search).

Example(s) of Storing Extent Identifier(s) in Cache and Extent Map(s)

In one embodiment, file system 120 receives a request for a data block (e.g., from a user). In response to detecting a cache miss (e.g., a miss of cache 130 indicating that the requested data block is not part of cached data 135), temporary extent map search engine 320 searches temporary extent map 145 (e.g., a temporary table) for the data block. If the data block is not found, located, and/or identified in temporary extent map 145, base extent map search engine 335 searches base table 180 (e.g., a base table) for the data block. In some embodiments, an extent identifier is stored in cache 130 (e.g., extent identifiers 140(1)-(3) as shown in FIG. 1). In this example, the extent identifier is associated with the (requested) data block, and the extent identifier includes a start offset and an end offset. If extent map size engine 155 determines that a size of temporary extent map 145 (e.g., the temporary table) has exceed a threshold value (e.g., 8 MB), an object identifier is generated for the extent identifier, and the extent identifier is stored in temporary extent map 145.

Example(s) of Searching Multi-Level Extent Map(s) and Merging Result(s)

In certain embodiments, if extent map size engine 155 determines that the size of temporary extent map 145 has exceed a threshold value, merging engine 165 generates a merged table (e.g., merged extent map 170). Merged extent map 170 includes one or more extent identifiers and associated information (e.g., logical offsets, object identifier) stored in cache 130 as well as one or more extent identifiers and associated information (e.g., logical offsets, object identifier) stored in temporary extent map 145.

In one embodiment, file system 120 receives a request for an extent identifier. Cached data search engine 315 searches for the extent identifier in cache 130 and generates a first search value. The first search value indicates whether temporary extent map 145 should be searched. If the first search result indicates that the extent identifier is not found in cache 130, temporary extent map search engine 320 searches for the extent identifier in temporary extent map 145 and generates a second search result that indicates whether base extent map 180 should be searched.

In another embodiment, if the extent identifier is found in temporary extent map 145, extent overlap detector 325 determines whether the extent identifier overlaps with another extent identifier in cache 130. For example, as shown in FIG. 2B, extent identifiers 140(1) and 140(3) in temporary extent map 145 overlap with extent identifiers 140(4) and 140(6) in base extent map 180. Such overlap can also occur between extent identifiers in temporary extent map 145 and cache 130. If the extent identifier overlaps with another extent identifier, extent splitter 330 splits the extents and returns a portion of a range of the another extent identifier (e.g., in cache 130) that does not overlap with the extent identifier (e.g., in temporary extent map 145). However, if the extent identifier is not found in temporary extent map 145 by temporary extent map search engine 320, base extent map search engine 335 searches for the extent identifier in base extent map 180 and generates a third search result. In this example, the third search result merges base extent map search results 150 with the record in temporary extent map 145, and then finally merges base extent map search results 150 plus the record in temporary extent map 145) with search results previously determined by cached data search engine 315.

Processes to Improve Extent Map Performance

Figure 4:
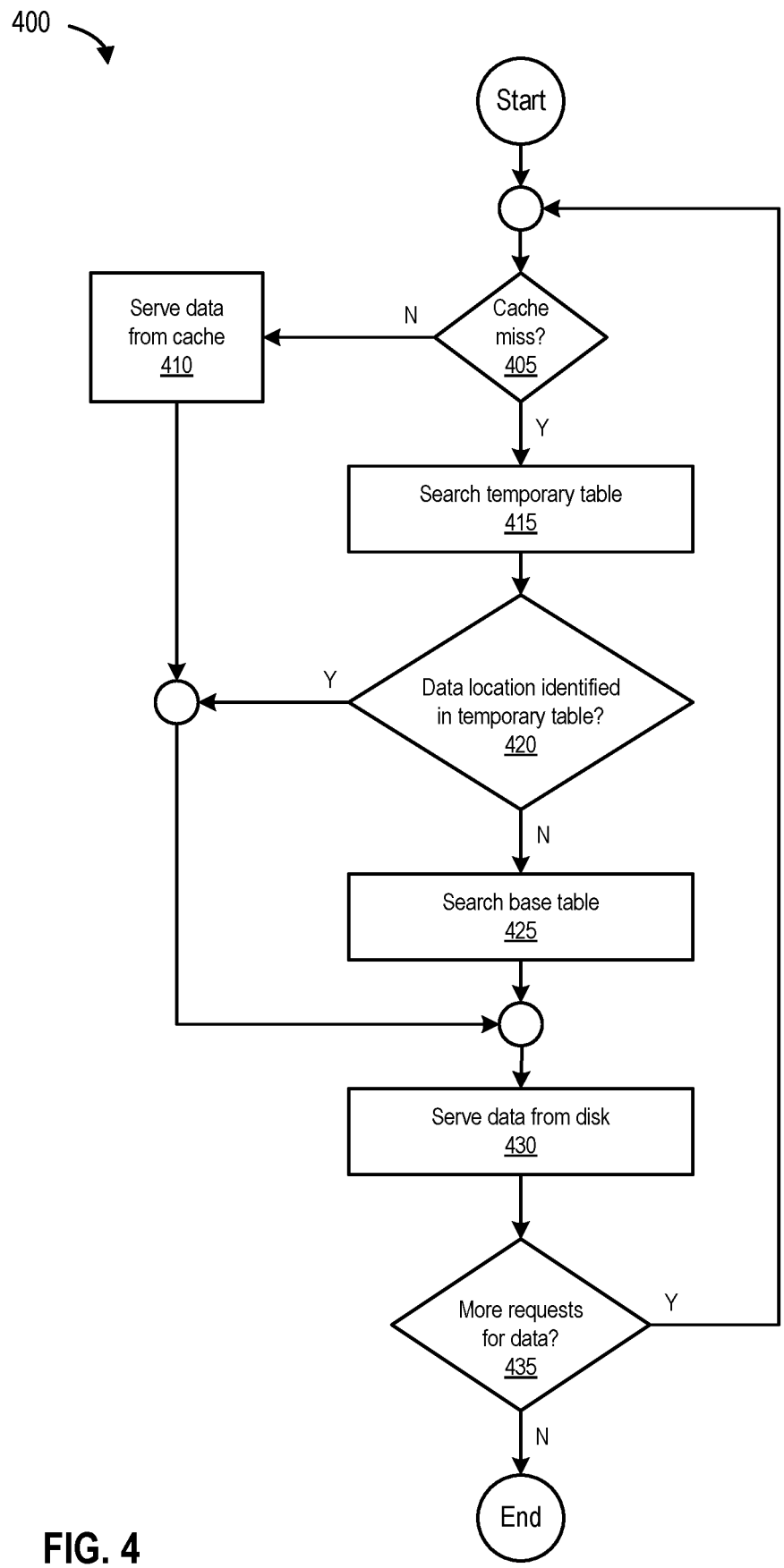
FIG. 4 is a flowchart 400 of a process for searching for extent identifiers in multiple extent maps, according to one embodiment of the present disclosure.

FIG. 4 is a flowchart 400 of a process for searching for extent identifiers in multiple extent maps, according to one embodiment. The process begins at 405 by determining if there is a cache miss (e.g., for requested data using cached data search engine 315). If there is no cache miss (e.g., if the data is found in cache 130), the process, at 430, serves data from disk (e.g., from data 180 in storage device 175). However, if there is a cache miss, the process, at 415, searches a temporary table (e.g., temporary extent map 145 using temporary extent map search engine 320).

At 420, the process determines if the data location has been identified (or located) in the temporary table. If the data is located in the temporary table, the process, at 430, serves data from disk (e.g., from data 180 in storage device 175). However, if the data location cannot be identified and/or located in the temporary table, the process, at 425, searches a base table (e.g., base extent map 180 using base extent map search engine 335). At 430, the process serves the (requested) data from disk, and at 435, determines whether there are more request(s) for data. If there is another request for data, the process loops back to 405. Otherwise, the process ends.

Figure 5A:
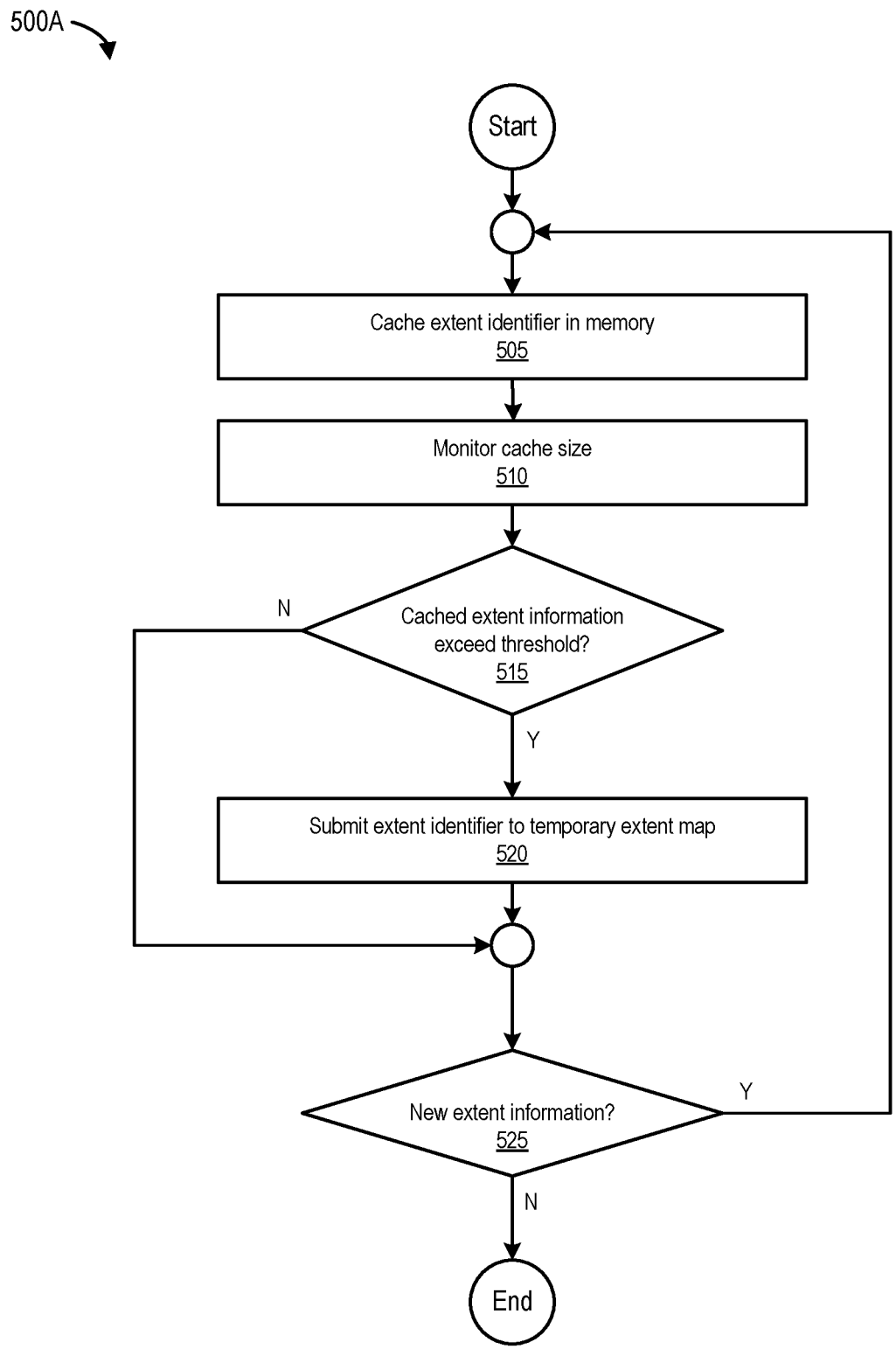
FIG. 5A is a flowchart 500A of a process for storing extent information in a temporary extent map, according to one embodiment of the present disclosure.

FIG. 5A is a flowchart 500A of a process for storing extent information in a temporary extent map, according to one embodiment. The process begins at 505 by caching an extent identifier in memory (e.g., in cache 130 as shown in FIG. 1). At 510, the process monitors cache size (e.g., the size of extent information in cache 130). At 515, the process determines whether the cached extent information exceeds a threshold (e.g., a size value for maximum allowable extent information assigned to cache 130 by a user, an administrator, or by some other method). If the cached extent information does not exceed the threshold, the process loops to 525 and determines if there is new extent information.

However, if the cached extent information does exceed the threshold, the process, at 520, submits the extent identifier (and associated extent information such as logical offsets, extent size, associated object identifier, and the like) to temporary extent map 145. At 525, the process determines if there is new extent information. If there is new extent information, the process loops back to 505. Otherwise, the process ends.

Figure 5B:
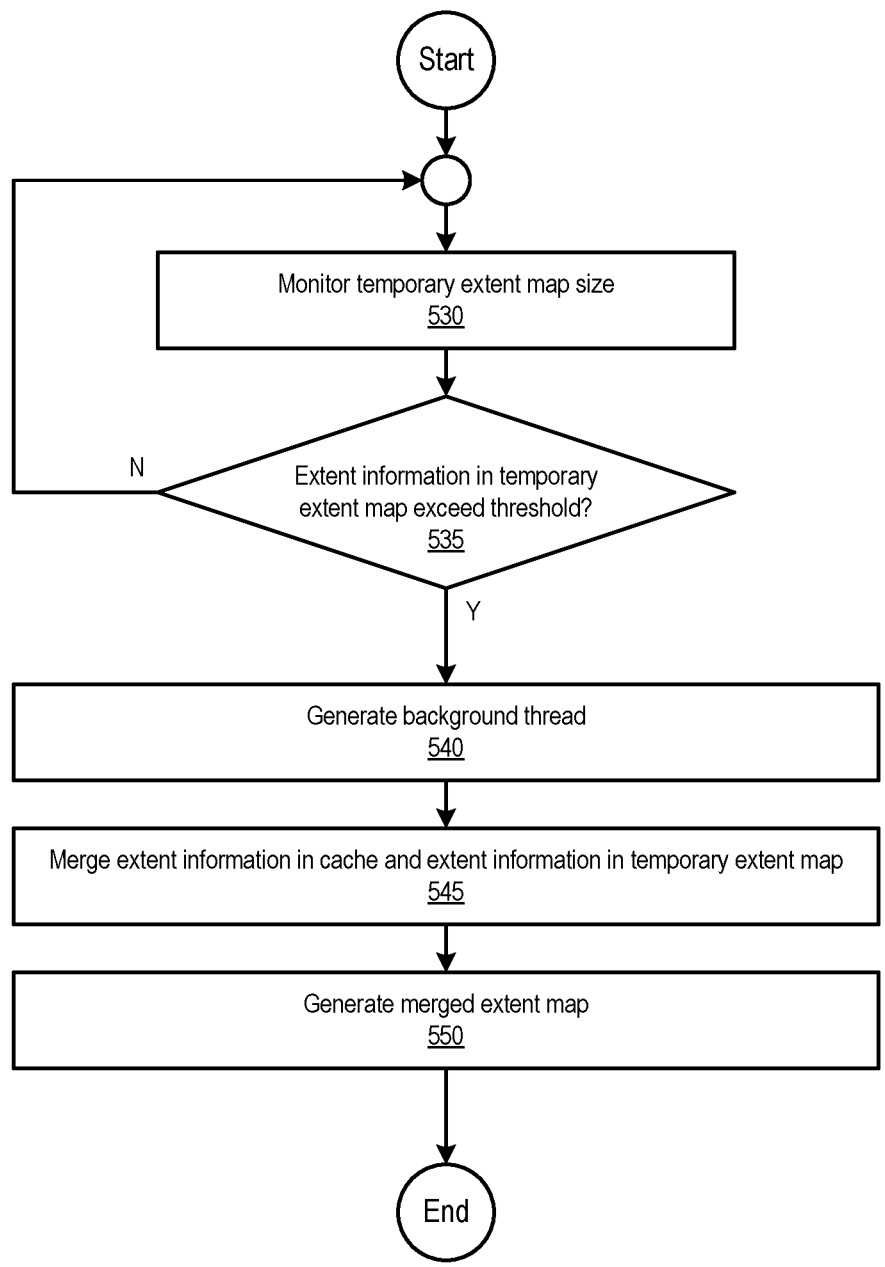
FIG. 5B is a flowchart 500B of a process for generating a merged extent map, according to one embodiment of the present disclosure.

FIG. 5B is a flowchart 500B of a process for generating a merged extent map, according to one embodiment. The process begins at 530 by monitoring a temporary extent map size. At 535, the process determines whether extent information in temporary extent map 145 exceed a threshold (e.g., a threshold value based on size using extent map size engine 155). At 540, the process generates a background thread, and at 545, merges extent information in cache 130 and extent information in temporary extent map 145 (e.g., using merging engine 165). The process ends at 550 by generating a merged extent map (e.g., merged extent map 170 generated by merging engine 165 as shown in FIG. 1).

Figure 6:
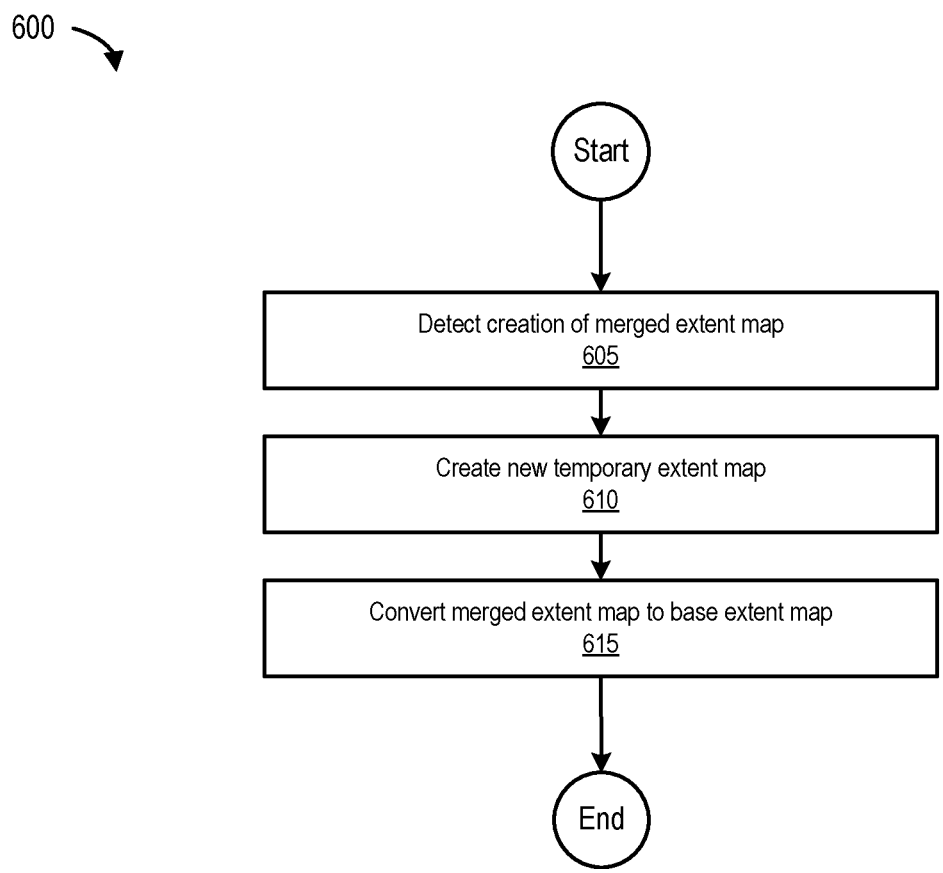
FIG. 6 is a flowchart 600 of a process for performing extent map conversion, according to one embodiment of the present disclosure.

FIG. 6 is a flowchart 600 of a process for performing extent map conversion, according to one embodiment. The process begins at 605 by detecting the creation of a merged extent map (e.g., merged extent map 170 created by merging engine 165). At 610, the process creates a new temporary extent map (e.g., a new empty small table in memory 115 and/or cache 130). At 615, the process ends by converting merged extent map 170 to base extent map 180, for example, using extent map conversion engine 160.

Figure 7:
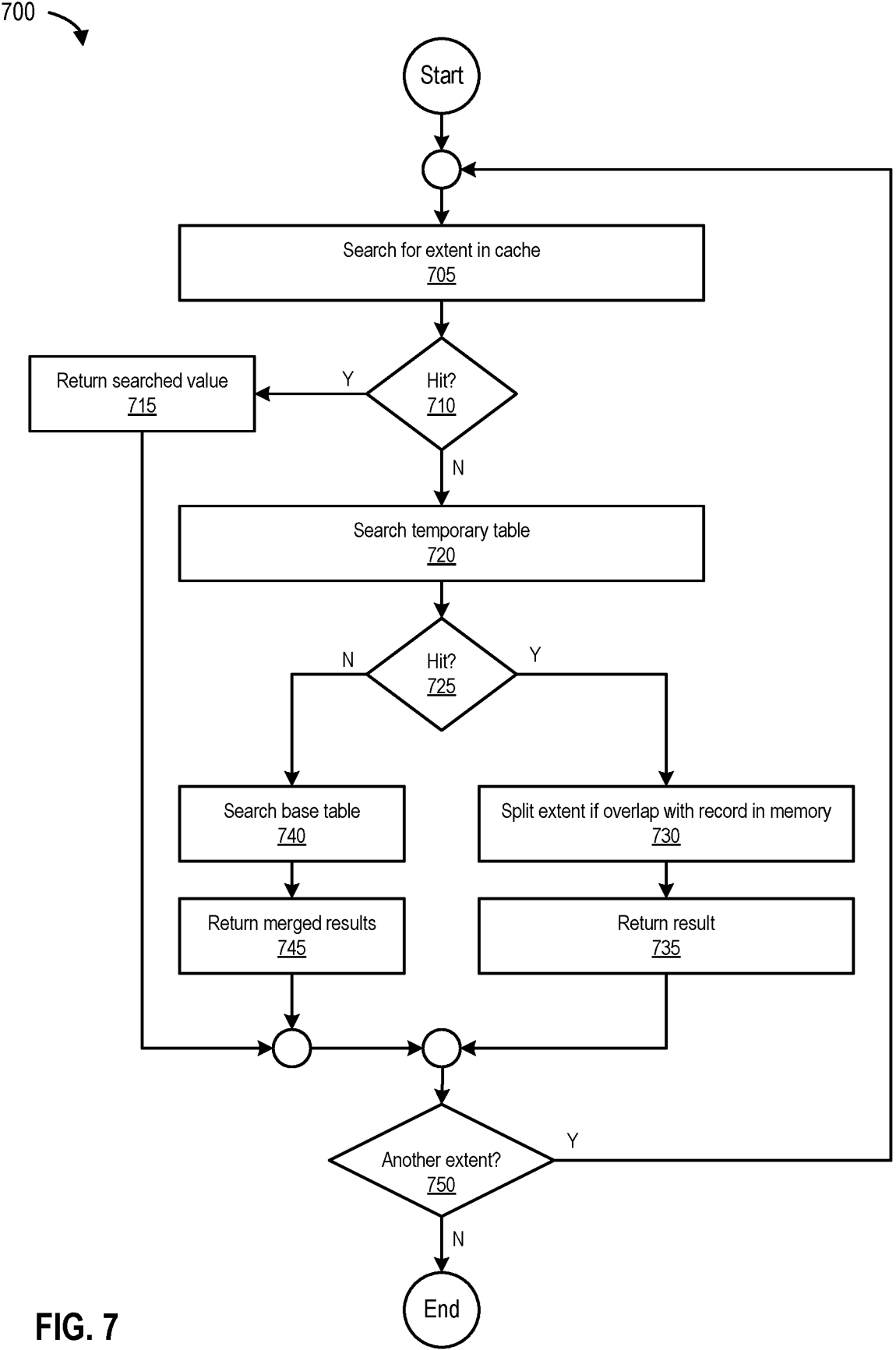
FIG. 7 is a flowchart 700 of a process for searching for extent identifiers in a temporary table and a base table, according to one embodiment of the present disclosure.

FIG. 7 is a flowchart 700 of a process for searching for extent identifiers in a temporary table and a base table, according to one embodiment. The process begins at 705 by searching for an extent in a cache (e.g., using an extent identifier that represents the extent). At 710, the process determines if there is a hit (e.g., whether the extent identifier associated with the extent is found in cache 130). If there is a hit, the process, at 715, returns the searched value (e.g., from cache 130) and ends at 750 by determining if there is another extent. However, if there is no hit, the process, at 720, searches a temporary table (e.g., temporary extent map 145 using temporary extent map search engine 320). At 725, the process determines if there is a hit (e.g., whether the extent identifier associated with the extent is found in temporary extent map 145). If there is a hit, the process, at 730, splits the extent if the extent overlaps with the record in memory, and at 735, returns the result. However, if there is no hit, the process, at 740, searches the base table (e.g., base extent map 180), and at 745, returns merged results. At 750, the process determines if there is another extent. If there is another extent, the process loops back to 705. Otherwise, the process ends.

Example Computing Environment

Figure 8:
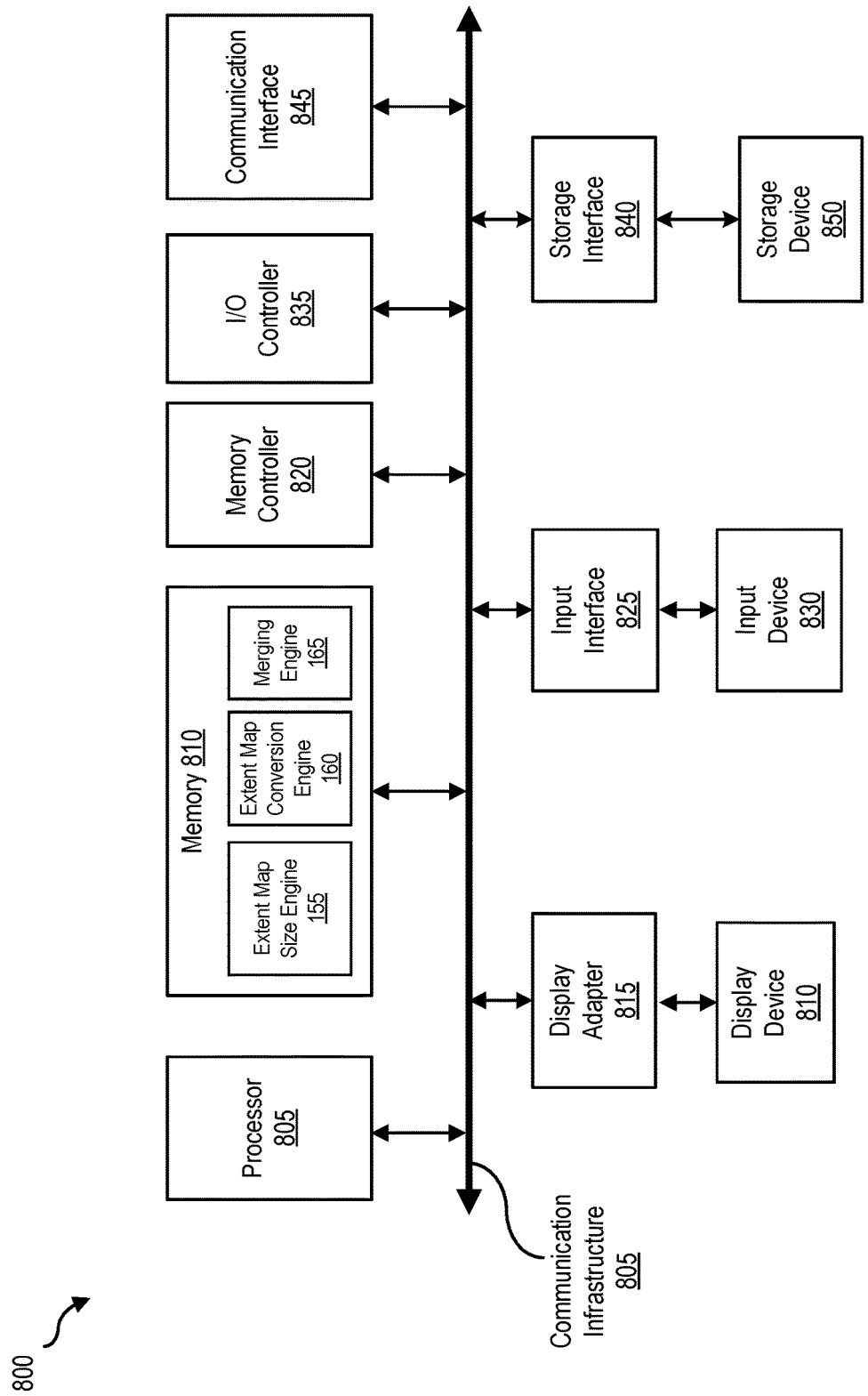
FIG. 8 is a block diagram 800 of a computing device, illustrating how an extent map engine, extent map conversion engine, and/or a merging engine can be implemented in software, according to one embodiment of the present disclosure.

FIG. 8 is a block diagram 800 of a computing device, illustrating how an extent map engine, extent map conversion engine, and/or a merging engine can be implemented in software, according to one embodiment. Computing system 800 can include computing device 105, and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 (e.g., like processor 110 as shown in FIG. 1) and a memory 860 (e.g., like memory 115 as shown in FIG. 1). By executing the software that executes compaction engine 150, computing system 800 becomes a special purpose computing device that is configured to improve extent map performance.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. Although not required, in certain embodiments computing system 800 may include both a volatile memory unit and a non-volatile storage device. In one example, program instructions implementing extent map engine 155, extent map conversion engine 160, and/or a merging engine 165 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein.

I/O controller 835 generally represents any type or form of module capable of coordinating and/or controlling the input and output functions of an appliance and/or a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type or form of communication device or adapter capable of facilitating communication between computing system 800 and one or more other devices. Communication interface 845 may facilitate communication between computing system 800 and a private or public network including additional computing systems. Examples of communication interface 845 include, without limitation, a wired network interface (such as a network interface card), a wireless network interface (such as a wireless network interface card), a modem, and any other suitable interface. Communication interface 845 may provide a direct connection to a remote server via a direct link to a network, such as the Internet, and may also indirectly provide such a connection through, for example, a local area network (e.g., an Ethernet network), a personal area network, a telephone or cable network, a cellular telephone connection, a satellite data connection, or any other suitable connection.

Communication interface 845 may also represent a host adapter configured to facilitate communication between computing system 800 and one or more additional network or storage devices via an external bus or communications channel. Examples of host adapters include, Small Computer System Interface (SCSI) host adapters, Universal Serial Bus (USB) host adapters, Institute of Electrical and Electronics Engineers (IEEE) 1394 host adapters, Serial Advanced Technology Attachment (SATA), Serial Attached SCSI (SAS), and external SATA (eSATA) host adapters, Advanced Technology Attachment (ATA) and Parallel ATA (PATA) host adapters, Fibre Channel interface adapters, Ethernet adapters, or the like. Communication interface 845 may also allow computing system 800 to engage in distributed or remote computing (e.g., by receiving/sending instructions to/from a remote device for execution).

As illustrated in FIG. 8, computing system 800 may also include at least one display device 810 coupled to communication infrastructure 805 via a display adapter 815. Display device 810 generally represents any type or form of device capable of visually displaying information forwarded by display adapter 815. Similarly, display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 (e.g., like storage device 175 as shown in FIG. 1) coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transferring and/or transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860 (e.g., memory 115), and/or various portions of storage device 850 (e.g., storage device 175). When executed by processor 855 (e.g., processor 110), a computer program loaded into computing system 800 (e.g., computing device 105) may cause processor 855 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Example Networking Environment

Figure 9:
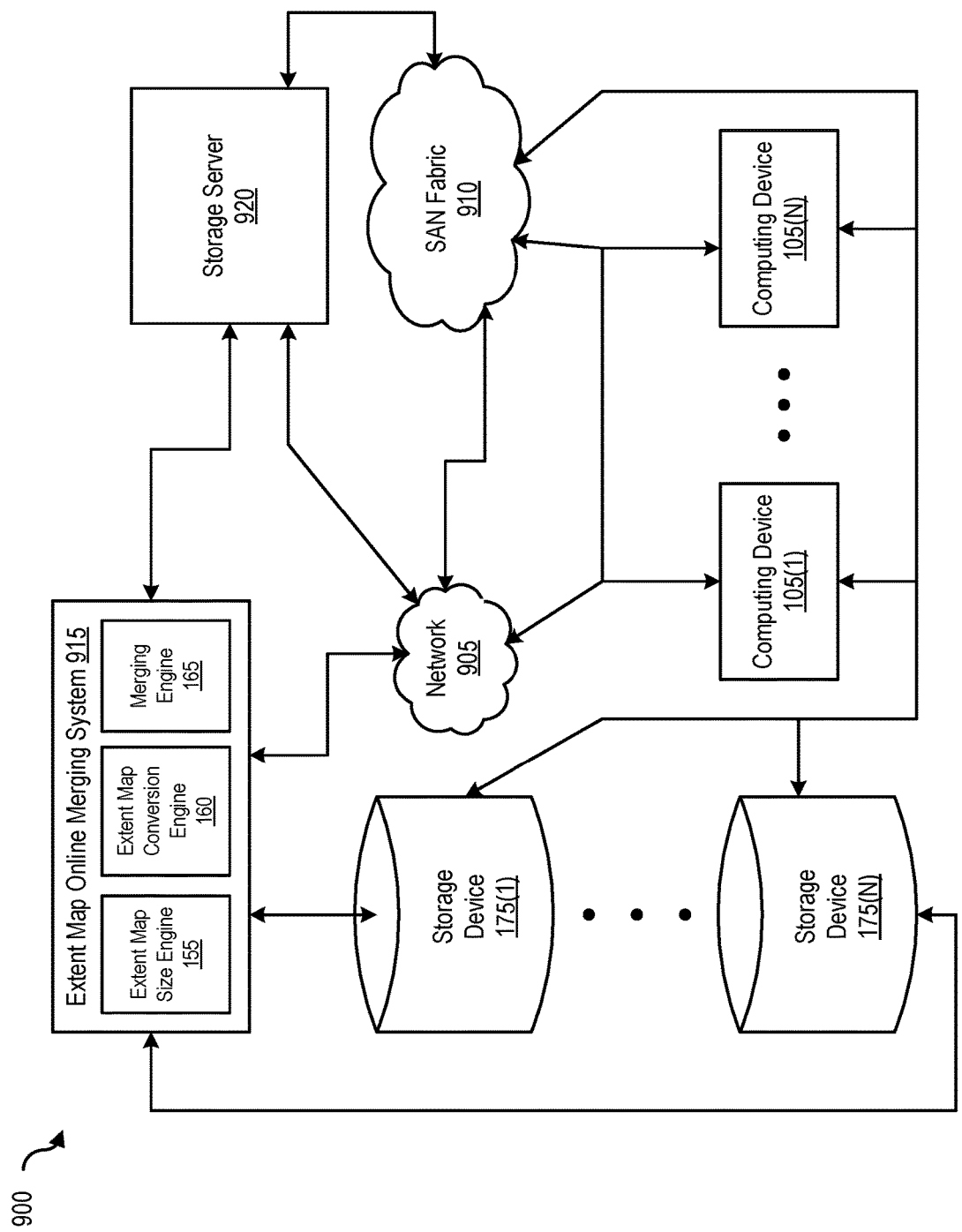
FIG. 9 is a block diagram 900 of a networked system, illustrating how various computing and storage devices and/or systems can communicate via a network, according to one embodiment of the present disclosure.

FIG. 9 is a block diagram of a networking system 900, according to one embodiment of the present disclosure. In certain embodiments, network-attached storage (NAS) devices may be configured to communicate between computing devices 105(1)-(N), storage devices 175(1)-(N), and/or extent map online merging system 915 using various protocols, such as Network File System (NFS), Server Message Block (SMB), or Common Internet File System (CIFS). Network 905 generally represents any type or form of computer network or architecture capable of facilitating communication between computing device 105(1)-(N), storage devices 175(1)-(N), and/or extent map online merging system 915.

In certain embodiments, a communication interface, may be used to provide connectivity between computing device 105(1)-(N), storage devices 175(1)-(N), and/or extent map online merging system 915, and network 905. The embodiments described and/or illustrated herein are not limited to the Internet or any particular network-based environment. Network 905 can be a Storage Area Network (SAN), and extent map online merging system 915 may be part of computing devices 105(1)-(N), or may be separate. If separate, compaction system 915 and computing devices 105 (1)-(N) may be communicatively coupled via network 905.

In one embodiment, all or a portion of one or more of the disclosed embodiments may be encoded as a computer program and loaded onto and executed by computing devices 105(1)-(N), and/or extent map online merging system 915, or any combination thereof. All or a portion of one or more of the embodiments disclosed herein may also be encoded as a computer program, stored on computing device 105(1)-(N), storage devices 175(1)-(N), and/or extent map online merging system 915, and distributed over network 905.

In some examples, all or a portion of computing device 105(1)-(N), storage devices 175(1)-(N), and/or extent map online merging system 915 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface.

Various functions described herein may be provided through a remote desktop environment or any other cloud-based computing environment. In addition, one or more of the components described herein may transform data, physical devices, and/or representations of physical devices from one form to another. For example, extent map online merging engine 150 may transform the behavior of computing device 105 in order to cause computing device 105 and storage device 175 to improve extent map performance.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, implemented in a computing device, comprising:
   receiving a request for data;
   determining whether a cache in memory of the computing device includes an extent identifier for a logical extent inclusive of the requested data, wherein logical extents include a start offset and an end offset for corresponding data in disk storage;
   in response to a determination that the cache does not include an extent identifier for a logical extent inclusive of the requested data,
      searching a plurality of extent identifiers stored in a temporary extent map for an extent identifier for a logical extent inclusive of the requested data, wherein
         the temporary extent map is stored in the cache operable to store updates to extent information stored in the cache;
   in response to a determination that the temporary extent map has an extent identifier for a logical extent inclusive of the requested data, determining whether the extent identifier in the temporary extent map is for a logical extent overlapping a logical extent corresponding to an extent identifier in the cache; and
   in response to a determination that the extent identifier for the logical extent inclusive of the requested data overlaps a logical extent corresponding to an extent identifier in the cache, providing non-overlapped portions of the logical extents from the temporary extent map in response to the request for data.

2. The method of claim 1, further comprising:
   storing an extent identifier for the logical extent including the non-overlapped portions in the cache;
   determining that a size of the temporary extent map has exceeded a threshold value;

generating an object identifier for the extent identifier stored in the cache;

storing the extent identifier and object identifier in the temporary extent map; and in response to a determination that the size of the temporary extent map has exceeded the threshold value, instantiating a background thread to generate a merged extent map.

3. The method of claim 2, further comprising:

receiving a request for data included in an extent identifier;

searching for the third extent identifier in the cache; and generating a first search result, wherein the first search result indicates whether the temporary extent map should be searched for extent identifiers for logical extents inclusive of the requested data.

4. The method of claim 3, further comprising:

if the first search result indicates that the extent identifier is not found in the cache, searching for the extent identifier in the temporary extent map; and generating a second search result, wherein the second search result indicates whether a base extent map should be searched for an extent identifier for logical extents inclusive of the requested data.

5. The method of claim 4, further comprising:

if the extent identifier is not found in the temporary extent map, searching for the extent identifier in the base extent map; and generating a third search result.

6. The method of claim 1, wherein the temporary extent map comprises a temporary extent map entry, a base extent map comprises a base extent map entry; and the temporary extent map is configured to be merged into the base extent map by virtue of the temporary extent map entry and the base extent map entry each comprising a plurality of corresponding fields comprising an extent identifier field.

7. The method of claim 6, further comprising:

determining that a size of the temporary extent map has exceeded a threshold value; and in response to a determination that the size of the temporary extent map has exceeded the threshold value, instantiating a background thread to generate a merged extent map, wherein the merged extent map comprises extent information from one or more extent identifiers stored in the cache and extent information from one or more extent identifiers stored in the temporary extent map.

8. The method of claim 1, wherein extent information in the cache includes key-value pairs;

extent information in the temporary extent map includes key-value pairs; and the key-value pairs of the cache and key-value pairs of the temporary extent map represent extents that can be split as a result of logical extent overlapping.

9. A non-transitory computer readable storage medium comprising program instructions executable to perform a method comprising:

receiving a request for data;

determining whether a cache in memory of a computing device includes an extent identifier for a logical extent inclusive of the requested data, wherein the logical extent of each extent identifier includes a start offset and an end offset for corresponding data in disk storage;

in response to a determination that the cache does not include an extent identifier for a logical extent inclusive of the requested data, searching a plurality of extent identifiers stored in a temporary extent map for an extent identifier for a logical extent inclusive of the requested data, wherein the temporary extent map is operable to store updates to extent information stored in the cache;

in response to a determination that the temporary extent map has an extent identifier for a logical extent inclusive of the requested data, determining whether the extent identifier in the temporary extent map is for a logical extent overlapping a logical extent corresponding to an extent identifier in the cache; and in response to a determination that the extent identifier for the logical extent inclusive of the requested data overlaps a logical extent corresponding to an extent identifier in the cache, providing non-overlapped portions of the logical extents from the temporary extent map in response to the request for data.

10. The non-transitory computer readable storage medium of claim 9, further comprising:

storing, in the cache, an extent identifier for the logical extent including the non-overlapped portions corresponding to the data; wherein the extent identifier is associated with the data;

determining that a size of the temporary extent map has exceeded a threshold value; and generating an object identifier for the extent identifier; and storing the extent identifier and object identifier in the temporary extent map.

11. The non-transitory computer readable storage medium of claim 10, further comprising:

in response to a determination that the size of the temporary extent map has exceeded the threshold value, instantiating a background thread to generate a merged extent map.

12. The non-transitory computer readable storage medium of claim 11, wherein the merged extent map comprises one or more extent identifiers from the extent identifiers stored in the cache and one or more extent identifiers from the extent identifiers stored in the temporary extent map.

13. The non-transitory computer readable storage medium of claim 10, further comprising:

receiving a request for data included in an extent identifier;

searching for the extent identifier in the cache; and generating a first search result, wherein the first search result indicates whether the temporary extent map should be searched for an extent identifier for logical extents inclusive of the requested data.

14. The non-transitory computer readable storage medium of claim 13, further comprising:

if the first search result indicates that the extent identifier is not found in the cache, searching for the extent identifier in the temporary extent map; and generating a second search result, wherein the second search result indicates whether a base extent map should be searched for an extent identifier for logical extents inclusive of the requested data.

15. The non-transitory computer readable storage medium of claim 9, wherein extent information in the cache includes a key-value pairs;

extent information in the temporary extent map includes key-value pairs; and the key-value pairs of the cache and key-value pairs of the temporary extent map represent extents that can be split as a result of logical extent overlapping.

16. A system comprising:
one or more processors; and
a memory coupled to the one or more processors, wherein the memory stores program instructions executable by the one or more processors to perform a method comprising:
receiving a request for data,
determining whether a cache in the memory includes an extent identifier for a logical extent inclusive of the requested data, wherein the logical extent for each extent identifier includes a start offset and an end offset for corresponding data in disk storage;
in response to a determination that the cache does not include an extent identifier for a logical extent inclusive of the requested data,
searching a plurality of extent identifiers stored in temporary extent map for an extent identifier for logical extents inclusive of the requested data, wherein
the temporary extent map is operable to store updates to extent information stored in the cache;
each extent identifier of the one or more extent identifiers is mapped in the temporary map to logical extents including a start offset and an end offset for corresponding data in disk storage;
in response to a determination that the temporary extent map as an extent identifier for a logical extent inclusive of the requested data, determining whether the extent identifier in the temporary extent map is for a logical extent overlapping a logical extent corresponding to an extent identifier in the cache; and
in response to a determination that the extent identifier for the logical extent inclusive of the requested data overlaps a logical extent corresponding to an extent identifier in the cache, providing non-overlapped portions of the logical extents from the temporary extent map in response to the request for data.

17. The system of claim 16, further comprising:
storing an extent identifier for the logical extent including the non-overlapped portions in the cache;
determining that a size of the temporary extent map has exceeded a threshold value;
generating an object identifier for the extent identifier stored in cache;
storing the extent identifier and object identifier in the temporary extent map; and
in response to a determination that the size of the temporary extent map has exceeded the threshold value, instantiating a background thread to generate a merged extent map, wherein
the merged extent map comprises one or more extent identifiers from extent identifiers stored in the cache and one or more extent identifiers from extent identifiers stored in the temporary extent map.

18. The system of claim 17, further comprising:
receiving a request for data included in an extent identifier;
searching for the extent identifier in the cache; and
generating a first search result, wherein the first search result indicates whether the temporary extent map should be searched for an extent identifier for a logical extent inclusive of the requested data.

19. The system of claim 18, further comprising:
if the first search result indicates that the extent identifier is not found in the cache, searching for the extent identifier in the temporary extent map; and
generating a second search result, wherein
the second search result indicates whether a base extent map should be searched for and extent identifier for a logical extent inclusive of the requested data.

20. The system of claim 16, wherein
extent information in the cache includes key-value pairs;
extent information in the temporary extent map includes key-value pairs; and
the key-value pairs of the cache and key-value pairs of the temporary extent map represent extents that can be split as a result of logical extent overlapping.

* * * * *